(12) United States Patent  (10) Patent No.: US 7,064,931 B2
Hutchinson  (45) Date of Patent: Jun. 20, 2006

(54) DISC DRIVE SUSPENSION OPTIMIZED FOR PRELOAD BEND DAMPER

(75) Inventor: Andrew John Hutchinson, New Prague, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 202 days.

(21) Appl. No.: 10/607,756

(22) Filed: Jun. 27, 2003

(65) Prior Publication Data

US 2004/0264054 A1   Dec. 30, 2004

(51) Int. Cl.
G11B 5/48 (2006.01)
G11B 21/16 (2006.01)

(52) U.S. Cl. .................. 360/244.8; 360/97.02
(58) Field of Classification Search ............. 360/244.8, 360/97.02
See application file for complete search history.

(56) References Cited

U.S. PATENT DOCUMENTS

| | | | |
|---|---|---|---|
| 4,760,478 A * | 7/1988 | Pal et al. | 360/244.3 |
| 4,819,094 A | 4/1989 | Oberg | 360/104 |
| 5,796,553 A | 8/1998 | Tangren | 360/104 |
| 5,825,590 A | 10/1998 | Ohwe | 360/104 |
| 5,963,397 A * | 10/1999 | Grill et al. | 360/244.8 |
| 6,005,750 A | 12/1999 | Willard et al. | 360/104 |
| 6,212,043 B1 | 4/2001 | Nakamura et al. | 360/244.3 |
| 6,271,996 B1 | 8/2001 | Houk et al. | 360/244.9 |
| 6,297,933 B1 | 10/2001 | Khan et al. | 360/244.2 |
| 6,307,715 B1 * | 10/2001 | Berding et al. | 360/244.8 |
| 6,704,164 B1 * | 3/2004 | Hiraoka | 360/244.8 |
| 6,798,618 B1 * | 9/2004 | Takagi et al. | 360/244.8 |
| 2003/0039074 A1 | 2/2003 | Erpelding | 360/244.2 |
| 2004/0061975 A1* | 4/2004 | Boutaghou et al. | 360/244.8 |

FOREIGN PATENT DOCUMENTS

JP   01248372 A   * 10/1989

* cited by examiner

*Primary Examiner*—Craig A. Renner
(74) *Attorney, Agent, or Firm*—Leanne R. Taveggia; Westman, Champlin & Kelly, P.A.

(57) ABSTRACT

A suspension for supporting a transducer in a data storage system includes a longitudinal axis, a proximal mounting section, and first and second opposing side edges. The suspension includes a rigid load beam section that extends longitudinally along the longitudinal axis. A flexible section is located between the proximal mounting section and the rigid load beam section. The flexible section has a preload bend transverse the longitudinal axis and a peak strain region located between the preload bend and the rigid load beam section. A damper covers a portion of the peak strain region.

19 Claims, 3 Drawing Sheets ns direction 132, the discs 107 drag air under the respective sliders 110 and along their air bearing surfaces. As air passes beneath the air bearing surfaces, air compression along the air flow path causes the air pressure between the disc 107 and the air bearing surfaces to increase, which creates an
DISC DRIVE SUSPENSION OPTIMIZED FOR PRELOAD BEND DAMPER

FIELD OF THE INVENTION

The present invention relates generally to data storage systems. In particular, the present invention relates to suspensions for supporting data recording heads.

BACKGROUND OF THE INVENTION

Disc drives are common data storage devices. A typical disc drive includes a housing that encloses a variety of disc drive components. The components include one or more rotating discs having data surfaces that are coated with a medium for storage of digital information in a plurality of circular, concentric data tracks. The discs are mounted on a spindle motor that causes the discs to spin and the data surfaces of the discs to pass under respective aerodynamic bearing disc head sliders. The sliders carry transducers, which write information to and read information from the data surfaces of the discs. The slider and transducer are often together referred to as a "head." An actuator mechanism moves the sliders from track to track across the surfaces of the discs under control of electronic circuitry. The actuator mechanism includes a track accessing arm and a suspension for each slider. The suspension includes a load beam and a gimbal. The load beam provides a preload force, which forces the slider toward the disc surface. The gimbal is positioned between the slider and the load beam, or is integrated in the load beam, to provide a resilient connection that allows the slider to pitch and roll while following the topography of the disc.

The suspension generates the preload force through a preload bend in the load beam, which becomes elastically deformed when the suspension is loaded into the disc drive. The preload bend is typically formed near a proximal mounting section of the load beam, which is adjacent the track accessing arm. The load beam has a relatively rigid portion, which transfers the preload force from the elastically deformed preload bend to the slider. The rigid portion is typically made by forming stiffening rails or flanges along the longitudinal edges of the suspension.

During operation, the suspension can experience off-track vibrations that can interfere with the proper positioning of the head by causing non-repeatable run-out (NRRO) and other read and write problems or limit track density. As suspensions become increasingly smaller in order to accommodate high density storage systems and to reduce weight, the resonance frequencies of the suspension have increased. Therefore, it is common to provide a damper on the suspension for damping the off-track vibrations. It is desirable for the damper to cover a large surface area of the suspension and be located along areas having the highest strain energies from vibrational modes, such as bending, torsional and sway modes. Current suspension designs have the highest strain energies along the preload bend. However, the preload bend region of the suspension typically has relatively narrow beams that have relatively small surface areas on which to attach a damper, which could limit its effectiveness.

Also, placing the damper along the preload bend would be difficult and costly to manufacture because of low tolerances in the preload bend region and the non-planar surface on which the damper would be attached. In addition, due to the small surface area relative to the current size constraints of typical damper material, the damper material may project from the sides of the suspension and thereby expose its damping layer to the internal environment of the disc drive. The exposed damping layer can contaminate as well as interfere with the performance of the disc drive. As a result, dampers are often placed along the rigid portion of the suspension, between the stiffening rails where there is a large planar surface on which to attach the damper, but with less damping effectiveness.

Embodiments of the present invention provide solutions to these and/or other problems and offer other advantages over the prior art.

SUMMARY OF THE INVENTION

A suspension for supporting a transducer in a data storage system includes a longitudinal axis, a proximal mounting section, and first and second opposing side edges. The suspension also includes a rigid load beam section that extends longitudinally along the longitudinal axis. A flexible section is located between the proximal mounting section and the rigid load beam section. The flexible section has a preload bend transverse the longitudinal axis and a peak strain region located between the preload bend and the rigid load beam section. A damper covers a portion of the peak strain region.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
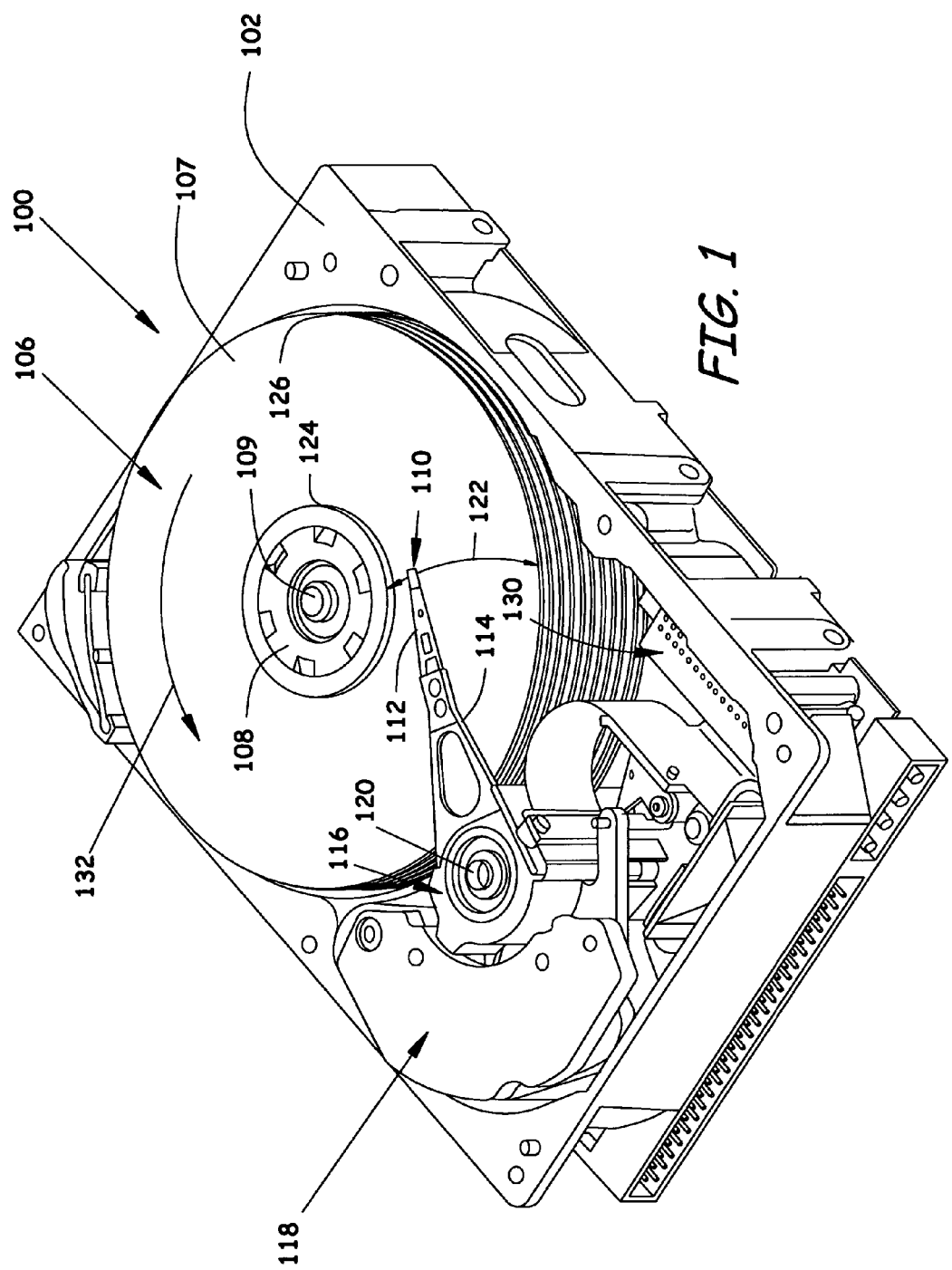
FIG. 1 is a perspective view of a data storage system.

FIG. 1 is a perspective view of a disc drive 100 in which embodiments of the present invention are useful. Disc drive 100 includes a base deck 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110, which carries a transducer for communication with the surface.

Each slider 110 is supported by a suspension 112 which is in turn attached to a track accessing arm 114 of an actuator mechanism 116. Actuator mechanism 116 is rotated about a shaft 120 by a voice coil motor 118, which is controlled by servo control circuitry within internal circuit 130. As voice coil motor 118 rotates actuator mechanism 116, sliders 110 move in an arcuate path 122 between a disc inner diameter 124 and a disc outer diameter 126.

During operation, as discs 107 rotate in a rotational direction 132, the discs 107 drag air under the respective sliders 110 and along their air bearing surfaces. As air passes beneath the air bearing surfaces, air compression along the air flow path causes the air pressure between the disc 107 and the air bearing surfaces to increase, which creates an aerodynamic lifting force that counteracts the preload force provided by suspension 112. The preload force forces sliders 110 towards the surfaces of the discs. The aerodynamic lifting force that counteracts the preload force causes the sliders 110 to lift and fly above, but in close proximity to the disc surfaces. While FIG. 1 illustrates one manner of actuating a data head proximate a data storage medium, the present invention, however, is applicable to data storage systems that use other actuation techniques, such as a linear actuator.

Figure 2:
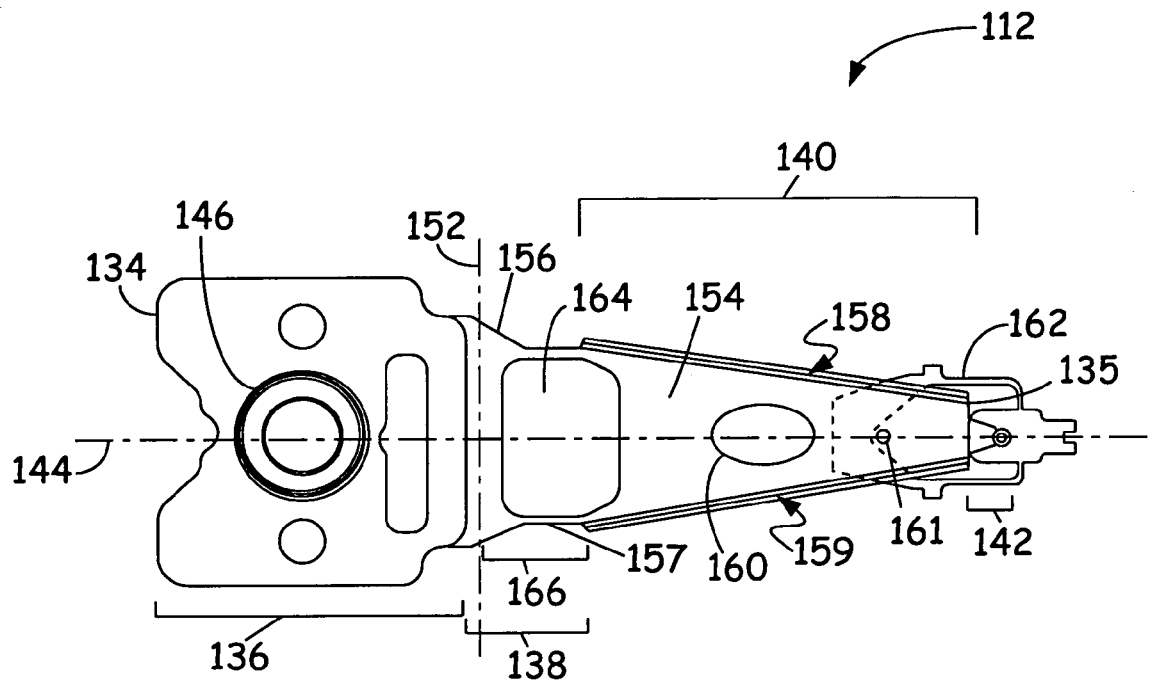
FIG. 2 is a top plan view of a suspension in accordance with an embodiment of the present invention.

FIG. 2 is a top plan view of suspension 112 as illustrated in FIG. 1 according to one embodiment of the present invention. Suspension 112 is formed of a single continuous piece of stainless steel or other metallic and/or non-metallic material, but can be formed with multiple pieces of material in alternative embodiments. Suspension 112 includes a proximal end 134, a distal end 135, a proximal mounting section 136, a flexible beam section 138, a rigid load beam section 140, a distal preload transfer section 142 and a pair of opposing lateral side edges 156 and 157. Suspension 112 further includes a longitudinal axis 144. Suspension 112 is generally symmetrical about axis 144.

Proximal mounting section 136 includes an actuator mounting aperture 146 for mounting suspension 112 to a respective actuator arm 114 (shown in FIG. 1), such as by ball-staking. Those skilled in the art should recognize that other methods of attachment could be used. Flexible beam section 138 includes a preload bend, which is formed about transverse bend axis 152. When suspension 112 is assembled in disc drive 100 (as shown in FIG. 1), the preload bend supplies a preload force to slider 110 (also shown in FIG. 1) which forces slider 110 towards the surface of the disc.

Rigid load beam section 140 extends from flexible beam section 138 to distal section 142. Rigid load beam section 140 has a substantially planar main body portion 154 and stiffening rails 158 and 159 on the respective side edges 156 and 157 of suspension 112. Stiffening rails 158 and 159 are bent out-of-plane with respect to main body portion 154 and terminate at a distal end 135. Stiffening rails 158 and 159 provide additional stiffness to rigid load beam section 140, which transfers the preload force generated by the preload bend to distal section 142.

Rigid load beam section 140 further includes a pair of alignment holes 160 and 161 which are used for alignment purposes when attaching gimbal (or "flexure") 162 and slider 110 to distal end 135. Alignment hole 160 is also used while attaching suspension 112 to actuator arm 114 as shown in FIG. 1. Gimbal 162 can be a separate piece of material that is attached to suspension 112 as shown in FIG. 2 or integrated into suspension 112 as a single, continuous piece of material.

Flexible beam section 138 has an extended, peak strain region 166, which extends along the longitudinal axis 144 and is located between the preload bend and rigid load beam section 140. In a typical suspension (without extended region 166), high strain energies due to bending mode, torsional mode and sway mode vibrations are concentrated along the preload bend. However, off-track vibrations along this region of the suspension are difficult to dampen since it is difficult to attach a damper on a formed surface and since this region has a relatively small surface area.

Extended peak strain region 166 moves the concentration of peak strain away from the preload bend and into region 166. Region 166 is substantially planar and provides a large surface area on which to attach a damper 164. Damper 164 covers at least a portion of peak strain region 166. In one embodiment, damper 164 includes a damping material made of a viscoelastic polymer that is a pressure sensitive adhesive. Those skilled in the art should recognize that the damping material of damper 164 could be other damping materials that include these characteristics: (1) high adhesion to a variety of materials through pressure; (2) low outgassing contamination; and (3) operable across a wide range of temperatures. A constraining layer of polyester, Mylar™ (a polyester film available from E.I. DuPont De Nemours and Company of Wilmington. Del.) or stainless steel covers the damping material. This list of example materials for the constraining layer is not exhaustive and can include other materials with constraining properties.

Since the high strain energies are concentrated away from the preload bend, damper 164 can be easily positioned to cover the areas on suspension 112 that experience peak strain energies. This allows the damper to more effectively dampen off-track vibrations, resulting in lower levels on non-repeatable run-out. With lower non-repeatable run-out, read and write performance can be improved, and track densities can be increased.

Figure 3:
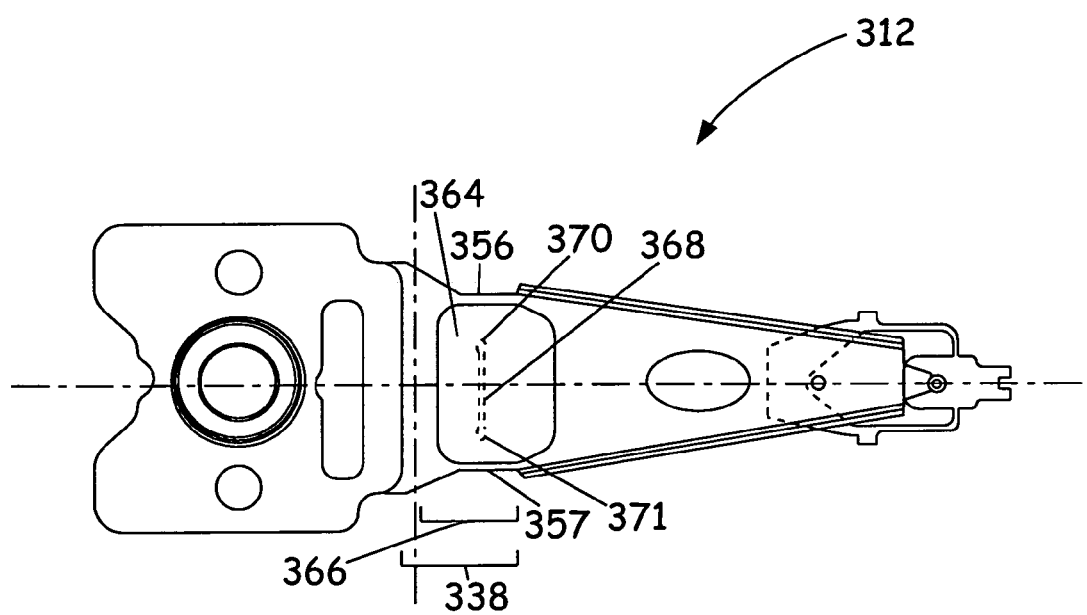
FIG. 3 is a top plan view of a suspension in accordance with an embodiment of the present invention.

FIG. 3 is a top plan view of suspension 312 in accordance with an alternative embodiment of the present invention. Suspension 312 includes all the features of suspension 112 of FIG. 2. However, suspension 312 further includes a strain focusing aperture 368 within peak strain region 366 of flexible beam section 338. Strain focusing aperture 368 extends through the thickness of the suspension material in peak strain region 366. In this embodiment, strain focusing aperture 368 is formed as an elongated slot with a first end 370 and a second end 371. It should be noted that strain focusing aperture 368 can have a different geometry then shown in FIG. 3. Strain focusing aperture 368 further concentrates the high strain between first end 370 and side edge 356 and between second end 371 and side edge 357. As mentioned above, these areas are easily dampened. Strain focusing aperture 368 not only concentrates high strain energies, but also provides a low vertical stiffness for suspension 312. Low vertical stiffness is desirable since it reduces variation in fly height of the slider by allowing the slider to easily follow the disc topography.

Damper 364 covers at least a portion of peak strain region 366 and is positioned over opening 368. Therefore, damper 364 is placed over the areas of high strain energies and thereby improves the effectiveness of damping vibrational mode frequencies in suspension 312.

Figure 4:
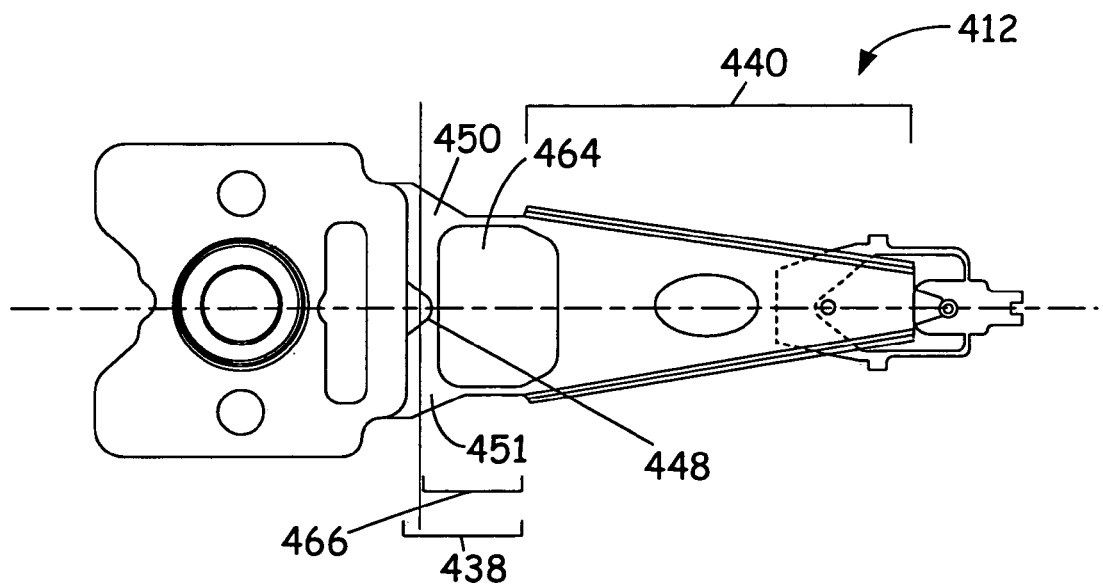
FIG. 4 is a top plan view of a suspension in accordance with an embodiment of the present invention.

FIG. 4 is a top plan view of a suspension 412 in accordance with another alternative embodiment of the present invention. Suspension 412 includes all the features of suspension 112 of FIG. 2. However, suspension 412 further includes a relatively small aperture 448 to further reduce the vertical stiffness of suspension 412 while maintaining a high lateral stiffness of the suspension. A combination of reducing vertical stiffness and increasing lateral stiffness improves the variation in fly height of the slider and vibration induced non-repeatable run out (NRRO). Aperture 448 defines flexible struts 450 and 451 within flexible beam section 438. Struts 450 and 451 have a relatively large surface area as compared to struts on similar suspensions of the prior art.

Although the addition of aperture 448 moves the location of peak strain toward the preload bend as compared to the embodiment shown in FIG. 2, the aperture is sized such that a large majority of the peak strain region 466 is still located between the preload bend and rigid load beam section 440. In this region, damper 464 can be easily mounted onto the suspension so as to dampen vibrations in the areas of high strain energies.

Figure 5:
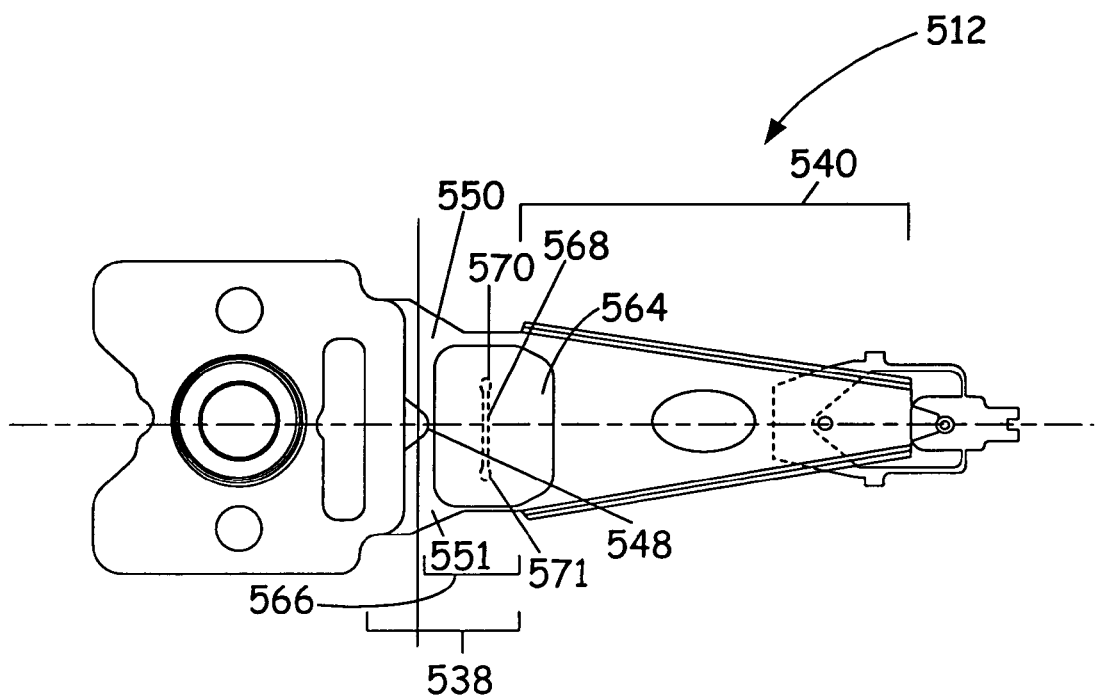
FIG. 5 is a top plan view of a suspension in accordance with an embodiment of the present invention.

FIG. 5 is a top plan view of a suspension 512 in accordance with another embodiment of the present invention. Suspension 512 includes all the features of suspension 412 of FIG. 4. However, suspension 512 further includes strain focusing aperture 568 within peak strain region 566 of flexible beam region 538. Strain focusing aperture 568 extends through the suspension material in peak strain region 566, which is between a distal end of flexible struts 550 and 551 and rigid load beam 540. In this embodiment, strain focusing aperture 568 is formed as an elongated slot with a first end 570 and a second end 571. It should be noted that strain focusing aperture 568 can have a different geometry then shown in FIG. 5. Strain focusing aperture 568 further concentrates the high strain energies along suspension 512 in the area adjacent first end 570, in strut 550 and in the area adjacent second end 571, in strut 551. The addition of strain focusing aperture 568 moves the areas of high strain energies found in FIG. 4 toward the strain focusing aperture. The combination of aperture 548 and strain focusing aperture 568 provides an even lower vertical stiffness and minimal effect on lateral stiffness for suspension 512 than the vertical stiffness and lateral stiffnesses of FIGS. 2, 3, and 4.

Damper 564 covers at least a portion of peak strain region 566 and extends over strain focusing aperture 568. Therefore, damper 564 is placed over the area of high strain energies and thereby improves the effectiveness of damping vibration mode frequencies in suspension 512.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the data storage system while maintaining substantially the same functionality without departing from the scope and spirit of the present invention. In addition, although the preferred embodiment described herein is directed to a particular type of suspension, it will be appreciated by those skilled in the art that the teachings of the present invention can be applied to other suspension types, without departing from the scope and spirit of the present invention.

What is claimed is:

1. A suspension comprising:
a longitudinal axis;
a first side edge and a second side edge, the first and second side edges located on opposite sides of the longitudinal axis;
a proximal mounting section;
a rigid load beam section, wherein the first and second side edges in the rigid load beam section are positioned at a first angle with respect to the longitudinal axis;
a flexible section located between the proximal mounting section and the rigid load beam section and having a preload bend, wherein the first and second side edges are at least partially positioned in the flexible section at a second angle with respect to the longitudinal axis, wherein the first and second angles are different;
a peak strain region located between the preload bend and the rigid load beam section, wherein the peak strain region is located at least partially on the longitudinal axis; and
a damper covering at least a portion of the peak strain region.

2. The suspension of claim 1, wherein the peak strain region further includes a strain focusing aperture.

3. The suspension of claim 2, wherein the strain focusing aperture comprises an elongated slot, which extends transversely to the longitudinal axis and has first and second ends that are respectively spaced from the first and the second opposing side edges of the suspension.

4. The suspension of claim 3, wherein the strain focusing aperture concentrates strain energy in the peak strain region between the first end of the strain focusing aperture and the first side edge and between the second end of the strain focusing aperture and the second side edge.

5. The suspension of claim 4, wherein the damper covers a portion of the surface area of the suspension that is located between the first end of the strain focusing aperture and the first side edge and between the second end of the strain focusing aperture and the second side edge.

6. The suspension of claim 2, wherein the damper covers the strain focusing aperture.

7. The suspension of claim 1, wherein the flexible section further includes a pair of spaced, elongated flexible struts extending from the proximal mounting section toward the peak strain region, and wherein the preload bend is formed across the flexible struts.

8. The suspension of claim 7, wherein the flexible section further includes a strain focusing aperture located between a distal end of the first and second flexible struts and the rigid load beam section.

9. The suspension of claim 8, wherein the strain focusing aperture comprises an elongated slot extending transversely to the longitudinal axis and having first and second ends, which are spaced from the first and second side edges, respectively.

10. The suspension of claim 9, wherein the damper covers a portion of the surface area of the suspension that is located between the first end of the strain focusing aperture and the first side edge and between the second end of the strain focusing aperture and the second side edge.

11. A suspension comprising:
a longitudinal axis;
a proximal mounting section;
a rigid load beam section;
a flexible section located between the proximal mounting section and the rigid load beam section, the flexible section having a preload bend;
a peak strain region located between the preload bend and the rigid load beam section, wherein the peak strain region is located at least partially the longitudinal axis;
a strain focusing aperture located within the peak strain region; and
a damper covering at least a portion of the peak strain region.

12. The suspension of claim 11, wherein the strain focusing aperture comprises an elongated slot, which extends transversely to the longitudinal axis and has first and second ends that are spaced from first and second side edges of the suspension, respectively.

13. The suspension of claim 12, wherein the strain focusing aperture concentrates the peak strain energy between the first end of the strain focusing aperture and the first side edge and between the second end of the strain focusing aperture and the second side edge.

14. The suspension of claim 13, wherein the damper covers a portion of the surface area of the suspension that is located between the first end of the strain focusing aperture and the first side edge and between the second end of the strain focusing aperture and the second side edge.

15. The suspension of claim 11, wherein the damper covers the strain focusing aperture.

16. The suspension of claim 11, wherein the flexible section further includes a pair of spaced, elongated flexible struts extending from the proximal mounting section toward the peak strain region, and wherein the preload bend is formed across the flexible struts.

17. The suspension of claim 16, wherein the strain focusing aperture is located between the distal end of the first and second flexible struts and the rigid load beam section.

18. The suspension of claim 17, wherein the strain focusing aperture comprises an elongated slot extending transversely to the longitudinal axis and having first and second ends, which are spaced from first and second side edges of the suspension, respectively.

19. The suspension of claim 18, wherein the damper covers a portion of the surface area of the suspension that is located between the first end of the strain focusing aperture and the first side edge and between the second end of the strain focusing aperture and the second side edge.

* * * * *